UNITED STATES PATENT OFFICE

1,951,807

4 - PHENALKYL - 3 - KETO-3,4-DIHYDRO-1,4-BENZOXAZINES AND PROCESS FOR THE MANUFACTURE OF SAME

Ernst Preiswerk and Heinrich Mayer, Basel, Switzerland, assignors to Hoffmann-La Roche Inc., Nutley, N. J., a corporation of New Jersey No Drawing. Application January 7, 1932, Serial No. 585,394. In Germany April 17, 1931

6 Claims. (Cl. 260—28)

It is known that by the action of alkyl iodide on an alkali salt of 3-keto-3,4-dihydro-1,4-benzoxazine an alkyl group is introduced in the 4-position. Thus Wheeler and Barnes (American Chemical Journal, vol. 20, page 555) described the methyl- and ethyl-compound. Other derivatives of 3-keto-3,4-dihydro-1,4-benzoxazine, alkylated in the 4-position, most particularly the aralkyl compounds, have not yet been prepared.

It has now been found that by aralkylation of 3-keto-3,4-dihydro-1,4-benzoxazine, its derivatives and products of substitution, their alkali or alkaline-earth salts respectively, aralkyl compounds are obtained, which possess therapeutically valuable properties. Whereas the 4-alkyl derivatives only have a very weak analgesic action, the 4-aralkyl compounds have proved to be excellent spasmolytics, their toxicity at the same time being very slight. They are therefore to be used for therapeutic purposes.

The aralkylation of 3-keto-3,4-dihydro-1,4-benzoxazine and its derivatives, their alkali and alkaline-earth salts respectively may be done in many different ways. It is for instance by no means necessary to use aralkyl iodides. With the aid of the aralkyl bromides and chlorides, which are technically more easily obtained and cheaper, the reaction is likewise very easily carried out and the yield is excellent.

Example 1

149 parts by weight of 3-keto-3,4-dihydro-1,4-benzoxazine are well mixed with 138 parts by weight of calcined and sieved potassium carbonate and heated for 6 hours with 253 parts by weight of benzyl chloride in an oil bath at 160° C. while stirring. The reaction product is then left to cool to 100° C. and the excess of benzyl chloride is distilled off with steam. Hereafter 30 parts by weight of a 30% solution of sodium hydroxide are added dropwise in order to dissolve any traces of unchanged 3-keto-3,4-dihydro-1,4-benzoxazine. On being left to cool, the reaction product, which at first is oily and insoluble in water and sodium hydroxide, crystallizes and is then separated from the alkaline liquid. The yield is nearly theoretical. For purification the reaction product may be distilled in vacuo and recrystallized from petroleum ether and methyl alcohol. The pure 4-benzyl-3-keto-3,4-dihydro-1,4-benzoxazine melts at 70–71° C. The product is represented by the following graphic formula:

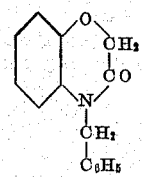

Example 2

By dissolving 149 parts by weight of 3-keto-3,4-dihydro-1,4-benzoxazine in 2500 parts by volume of a 0.4-normal baryta solution and evaporating the solution in vacuo, the dry barium salt is first obtained. After heating it with 300 parts by weight of benzyl-chloride for 3 hours to 100° C. while stirring, the benzylation will be complete. The excess of benzyl chloride is then blown off with steam, the reaction product, which on cooling crystallizes, washed several times by decantation with water in order to remove the barium salts. For further purification one may proceed in the manner described in Example 1. The product is represented by the following graphic formula:

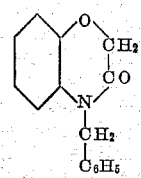

Example 3

247 parts by weight of dry 2-phenyl-3-keto-3,4-dihydro-1,4-benzoxazine sodium (the 2-phenyl-3-keto-3,4-dihydro-1,4-benzoxazine melting at 164° C. may be obtained by reduction of o-nitrophenoxyphenylacetic ester formed by interaction between dry o-nitrophenol potassium and phenylbromacetic ester) are heated under a reflux condenser to the boiling point with 260 parts by weight of benzyl bromide and 500 parts by weight of benzene while stirring for 4 hours. When the conversion is terminated, the benzene and excess of benzyl bromide are removed with steam, then 30 parts by weight of a 30% solution of sodium hydroxide are added in order to remove any traces of the unchanged compound, the reaction product is left to cool and separated from the alkaline liquid. After recrystallization from methyl-alcohol the 2-phenyl-4-benzyl-3-keto-3,4-dihydro-1,4-benzoxazine is obtained in needles melting at 90° C. The product is represented by the following graphic formula:

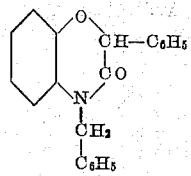

Example 4

163 parts by weight of 6-methyl-3-keto-3,4-dihydro-1,4-benzoxazine are dissolved in an alcoholic solution of sodium ethylate prepared from 35 parts by weight of metallic sodium and 700 parts by weight of alcohol. Then 200 parts by weight of benzyl chloride are added and the solution boiled under a reflux condenser. After about 3 hours the conversion is terminated, a fact noticeable by the attainment of neutrality to phenolphthalein. After addition of 60 parts by weight of a 30% solution of sodium hydroxide and distillation with steam, the reaction product is treated in the manner described in Example 1. The 4-benzyl-5-methyl-3-keto-3.4-dihydro-1.4-benzoxazine is obtained in colourless needles melting at 118° C. The product is represented by the following graphic formula:

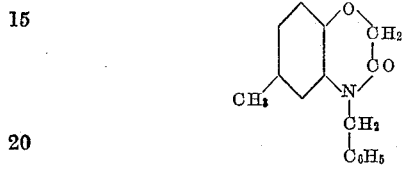

The substituted benzoxazine used as starting material may be obtained in quite analogous manner to the unsubstituted compound. Its melting point is 205° C.

*Example 5*

149 parts by weight of 3-keto-3.4-dihydro-1.4-benzoxazine are dissolved in 1000 parts by volume of a normal methyl alcoholic solution of benzylphenyldimethylammoniumhydroxide and the solution heated under a reflux condenser to the boiling point. After a short time the alkaline reaction of the solution to phenolphthalein will have disappeared. If the reaction product is then treated in the manner already described several times, the 4-benzyl-3-keto-3.4-dihydro-1.4-benzoxazine is obtained in excellent yield. The product is represented by the following graphic formula:

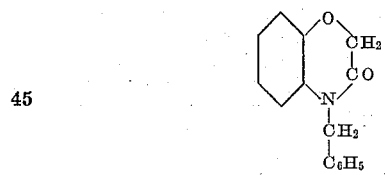

*Example 6*

184 parts by weight of the dry potassium salt of 3-keto-3.4-dihydro-1.4-benzoxazine are heated with 240 parts by weight of o-chlorobenzylchloride in a boiling water bath, until the product shows no reaction to moist phenolphthalein paper, which will be after about 2 hours. After removing the excess of o-chlorobenzylchloride with steam, adding to the residue 60 parts by weight of a 30% solution of sodium hydroxide and letting the product cool while stirring, the 4-o-chlorobenzyl-3-keto-3.4-dihydro-1.4-benzoxazine, which after recrystallization from methyl alcohol melts at 105° C., is obtained. The product is represented by the following graphic formula:

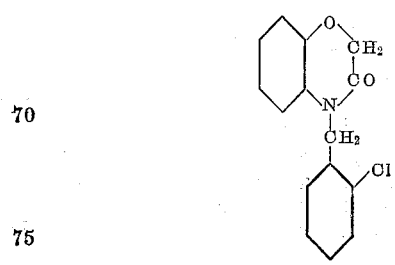

*Example 7*

149 parts by weight of 3-keto-3.4-dihydro-1.4-benzoxazine are stirred together with 150 parts by weight of water and 127 parts by weight of benzyl chloride. The mixture is heated to 80-90° C. Then 140 parts by weight of a 30% solution of sodium hydroxide are added and after 4 hours a further 70 parts by weight, the product being allowed to cool while stirring. The compound thus obtained is identical with the compound described in Example 1. From the alkaline solution separated from the reaction product unchanged 3-keto-3.4-dihydro-1.4-benzoxazine may be obtained by acidification. The product is represented by the following graphic formula:

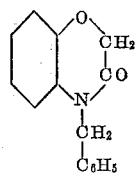

*Example 8*

171 parts by weight of the dry sodium salt of 3-keto-3.4-dihydro-1.4-benzoxazine and 230 parts by weight of β-phenylethylbromide are stirred for several hours at 100° C., until a sample of the product does not react to moist phenolphthalein paper. The reaction product is then treated as described in Example 1 and 4-(β-phenylethyl)-3-keto-3.4-dihydro-1.4-benzoxazine is obtained in needles melting at 87° C. The product is represented by the following graphic formula:

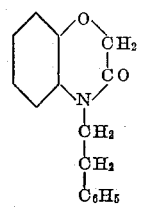

We claim:
1. A 4-phenalkyl-3-keto-3.4-dihydro-1.4-benzoxazine having the structural formula:

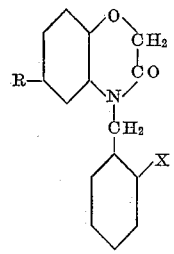

where R represents hydrogen or an alkyl radical and where X represents hydrogen or a halogen atom.

2. 4-benzyl-3-keto-3.4-dihydro-1.4-benzoxazine, which is a colorless crystallized compound melting at 70-71° C., difficultly soluble in water but readily soluble in organic solvents and possessing a strong antispasmodic action and but slight toxicity.

3. A process for the manufacture of a 4-phenalkyl-3-keto-3.4 dihydro - 1.4 - benzoxazine which consists in heating a phenyl-alkyl-halide with a compound of the following general formula:

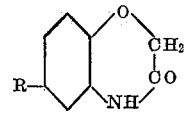

R representing hydrogen or an alkyl radical, which compound may be in the form of its alkali forming metal salt.

4. A process for the manufacture of 4-benzyl-3-keto-3.4-dihydro-1.4-benzoxazine, which consists in heating benzyl chloride with 3-keto-3.4-dihydro-1.4-benzoxazine.

5. A process for the manufacture of 4-benzyl-3-keto-3.4-dihydro-1.4-benzoxazine which consists in heating benzyl chloride with an alkali-forming metal salt of 3-keto-3.4-dihydro-1.4-benzoxazine.

6. A process for the manufacture of 4-benzyl-3-keto-3.4-dihydro-1.4-benzoxazine which consists in heating benzyl chloride with the barium salt of 3-keto-3.4-dihydro-1.4-benzoxazine.

ERNST PREISWERK.
HEINRICH MAYER.